Sept. 30, 1924.
V. A. GIHLSTROM ET AL
1,510,268
COFFEE URN HEATING DEVICE
Filed Aug. 22, 1923
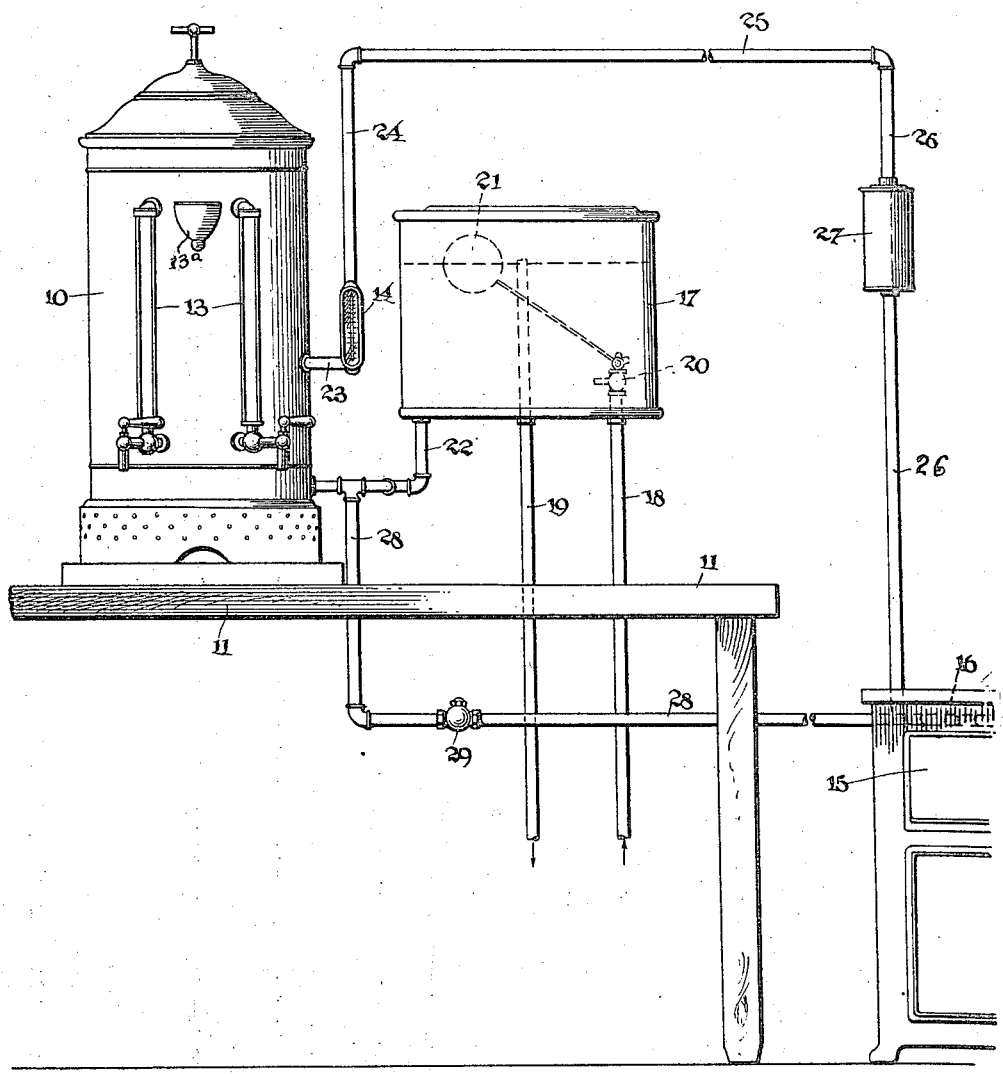
INVENTORS
V. A. Gihlstrom,
E. E. Lavalleur,
BY
Geo. P. Kimmel ATTORNEY.

Patented Sept. 30, 1924.

1,510,268

UNITED STATES PATENT OFFICE.

VICTOR A. GIHLSTROM AND EUGENE E. LAVALLEUR, OF SALEM, OREGON.

COFFEE-URN-HEATING DEVICE.

Application filed August 22, 1923. Serial No. 658,790.

*To all whom it may concern:*

Be it known that we, VICTOR A. GIHLSTROM and EUGENE E. LAVALLEUR, citizens of the United States, residing at Salem, in the county of Marion and State of Oregon, have invented certain new and useful Improvements in Coffee-Urn-Heating Devices, of which the following is a specification.

This invention relates to steam or hot water heating systems, more particularly to devices of this character employed in restaurants for supplying heat to coffee urns and the like, and has for one of its objects to provide a simply constructed apparatus whereby a portion of the heat from a cooking range is utilized to heat the coffee urn.

Another object of the invention is to provide a device of this character, having means whereby the supply of water as a heating medium is constantly and automatically maintained.

With these and other objects in view the invention consists in certain novel features of construction as hereinafter shown and described and then specifically pointed out in the claims, and in the drawings illustrative of the preferred embodiment of the invention.

The figure represents an elevation of the improved apparatus.

The improved apparatus comprises in general a receptacle, such as a coffee urn, represented as a whole at 10, mounted on a suitable stand 11, and with the usual gages 13 to denote the amount of coffee or the like in the inner receptacle and another gage indicated at 14 to denote the stage of the heating liquid in the outer shell or casing. Located at 13ᵃ is the overflow for the liquid in the shell of the urn.

A part of a cooking range is represented conventionally at 15 and includes a steam coil indicated at 16. A supply tank for the heating liquid is represented at 17 and provided with an intake 18 and overflow 19. The intake 18 is provided with a valve 20 arranged to be controlled by a float 21, to maintain a constant and uniform supply to the tank. It is to be noted that the tank 17 is not elevated above the urn 10 but is so positioned that the water in the urn will rise to the same level as in the tank, upon the start of the apparatus. This level of water though fluctuating will be substantially the same at all times.

A conductor pipe 22 leads from the bottom of the tank to the outer shell of the urn 10 while another conductor pipe 23 leads from the outer shell of the urn intermediate its height and constantly below the water line therein, and thence upwardly as at 24 and thence horizontally as at 25, and thence downwardly as at 26 and is coupled into the coil 16. A suitable condenser device, indicated conventionally at 27, is connected into the vertical portion 26 of the conductor.

A branch conductor 28 leads from the coil 16 into the outlet conductor 22, and is provided with a check valve, represented conventionally at 29.

The horizontal portion 25 of the coil supply conductor, it will be noted, is located a considerable distance above the line of the tank, the receptacle and the coil in the range, to insure a more complete and rapid circulation of the liquid and steam.

By this construction, when the device is started water will flow from the tank 17 through 22 into the outer shell of the urn 10 and through 28, through the coil 16 and into the pipe 26 and chamber 27 until the water is the same height in the urn shell and the pipe and chamber 26 and 27, as in the tank 17. Upon heating the coil 16 the water therein will be heated until converted into steam and, because of the check valve 29, the steam will not flow back through 28 and 22 but will rise and pass through 27, 25 and 24 into the urn, thereby heating the water therein and the water resulting from the condensation of the steam in the urn, will heat the other water therein and further flow back to coil 16, to there be reconverted to steam and passed back into the urn, to set up a circulation.

The preferred embodiment of the invention is disclosed in the drawings and set forth in the specification, but it will be understood that modifications within the scope of the claims may be made in the construction without departing from the principle of the invention or sacrificing any of its advantages.

Having thus described the invention, what is claimed as new is:—

1. In a heating system of the character described, a receptacle, a valve controlled supply tank, a supply pipe connecting said tank with said receptacle, a pipe line having a one way valve therein, leading from said supply pipe to a heating coil, and a return steam pipe line leading from said coil to said receptacle, said return line extending above the water level of said receptacle and tank.

2. In a heating system of the character described, a receptacle having an overflow, a water supply tank, a supply pipe connecting said tank with said receptacle, a float valve in said tank adapted to maintain the water therein at a point below said overflow, a pipe line leading from said supply pipe to a heating element, a one way valve in said pipe line permitting water to flow only from said supply pipe to said element, and a return steam pipe leading from said element to said receptacle, said return pipe having a portion thereof positioned above the water level of said tank and receptacle.

In testimony whereof, we affix our signatures hereto.

VICTOR A. GIHLSTROM.
EUGENE E. LAVALLEUR.